United States Patent

Efflandt et al.

[15] 3,657,867
[45] Apr. 25, 1972

[54] REEL LAWN MOWER WITH FORWARDLY LOCATED CLIPPING RECEPTACLE

[72] Inventors: James F. Efflandt; Finn T. Irgens, both of Milwaukee, Wis.

[73] Assignee: Outboard Marine Corporation, Waukegan, Ill.

[22] Filed: Nov. 21, 1969

[21] Appl. No.: 878,838

[52] U.S. Cl. ..........................................56/17.2, 56/200
[51] Int. Cl. .......................................................A01d 53/06
[58] Field of Search ........................56/24, 26, 17.2, 198–206; 280/43

[56] References Cited

UNITED STATES PATENTS

| | | | |
|---|---|---|---|
| 2,858,141 | 10/1958 | Ertsgaard et al. | 280/43 X |
| 3,068,632 | 12/1962 | Postlewait et al. | 56/26 |
| 3,527,034 | 9/1970 | Hjelmquist | 56/26 |
| 383,632 | 5/1888 | Crosier | 56/199 |
| 625,669 | 5/1899 | Gorr | 56/200 |
| 503,509 | 8/1893 | Wansbrough | 56/198 UX |
| 1,927,152 | 9/1933 | Bolens | 56/200 |

FOREIGN PATENTS OR APPLICATIONS

| | | | |
|---|---|---|---|
| 538 | 2/1871 | Great Britain | 56/200 |
| 1,136,471 | 12/1968 | Great Britain | 56/199 |

*Primary Examiner*—Antonio F. Guida
*Assistant Examiner*—J. A. Oliff
*Attorney*—Robert E. Clemency, John W. Michael, Gerrit D. Foster, Bayard H. Michael, Paul R. Puerner, Joseph A. Gemignani, Andrew O. Riteris, Spencer B. Michael and Robert K. Gerling

[57] ABSTRACT

A lawn mower which includes a reel housing and a cutting reel rotatably supported in the reel housing. The reel housing includes a forwardly concave reel housing wall portion located rearwardly of the cutting reel. A downwardly concave deflector or discharge chute is hinged at its rearward end to the upper edge of the reel housing wall portion and is usable in a first position to promote forward and downward discharge of clippings onto the ground in front of the cutting reel, and in a second position displaced upwardly from the first position and pivotally connected to the upper edge of a rearwardly open receptacle for discharge of clippings into the receptacle. A remote control also is provided for pivoting the receptacle about the pivotal connection with the deflector to dump the receptacle contents downwardly and forwardly of the reel housing.

In a four wheel embodiment of the mower, the side walls which rotatably support the cutting reels are outwardly offset between the wheels so that the cutting reel extends between the wheels to permit cutting close to walls, hedges, etc. Height adjustment of the four wheel mower is provided by selectively locating the front wheel axles in any one of a series of vertically aligned, spaced axle apertures in the side walls.

In a two wheel embodiment of the invention, the cutting reel is rotatably supported by the side walls of a casing which includes a motor mounting pad. The casing is pivotally mounted to a frame, handle and wheel assembly. The angular position of the casing with respect to the pivotal connection of the casing and the frame assembly, and thus the height of the cutting reel, is adjusted by a series of concentrically aligned spaced apertures in frame side plates, and a bolt.

13 Claims, 7 Drawing Figures

INVENTORS
JAMES F. EFFLANDT
FINN T. IRGENS

BY Whealy, Wheeler, House & Clemency
ATTORNEYS

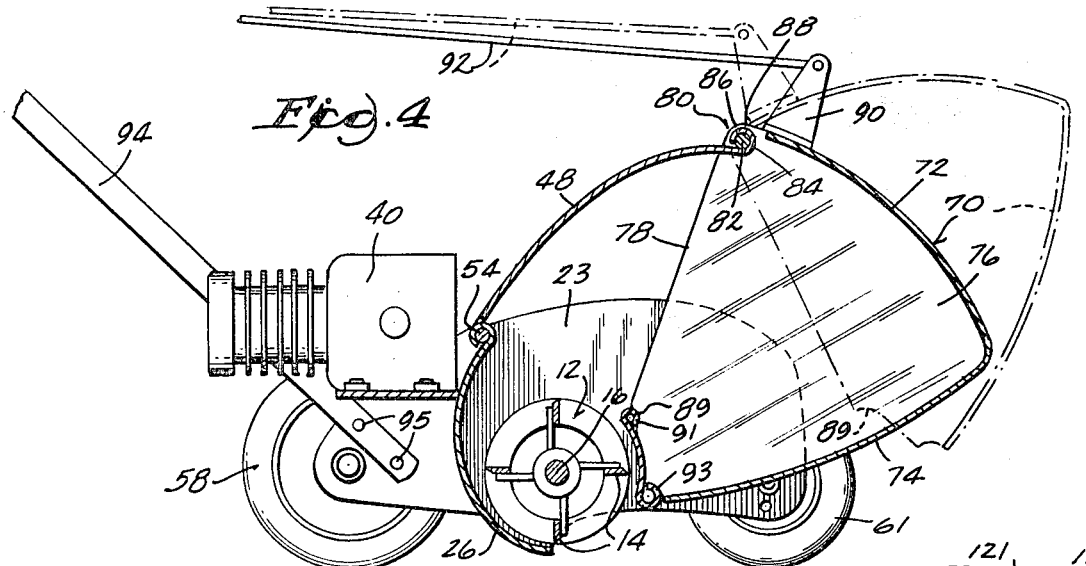
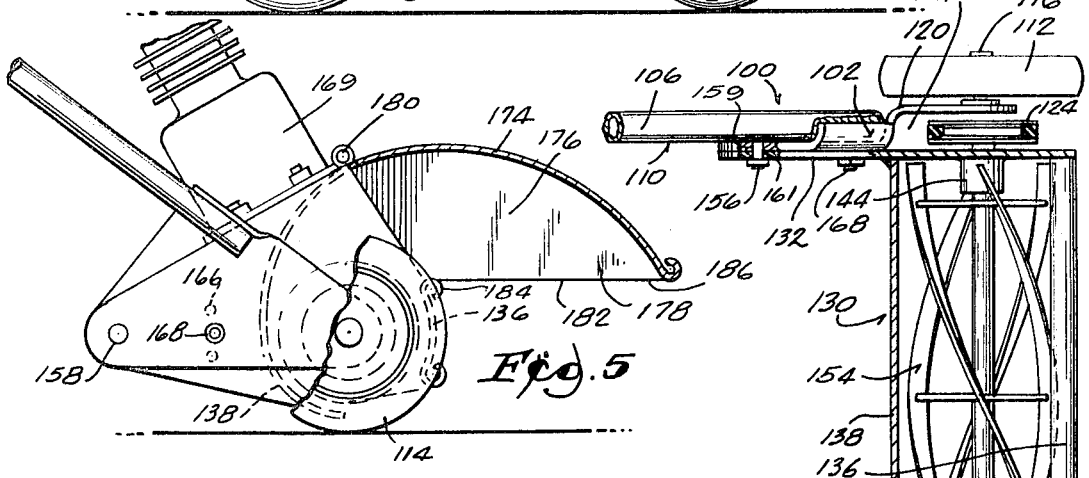
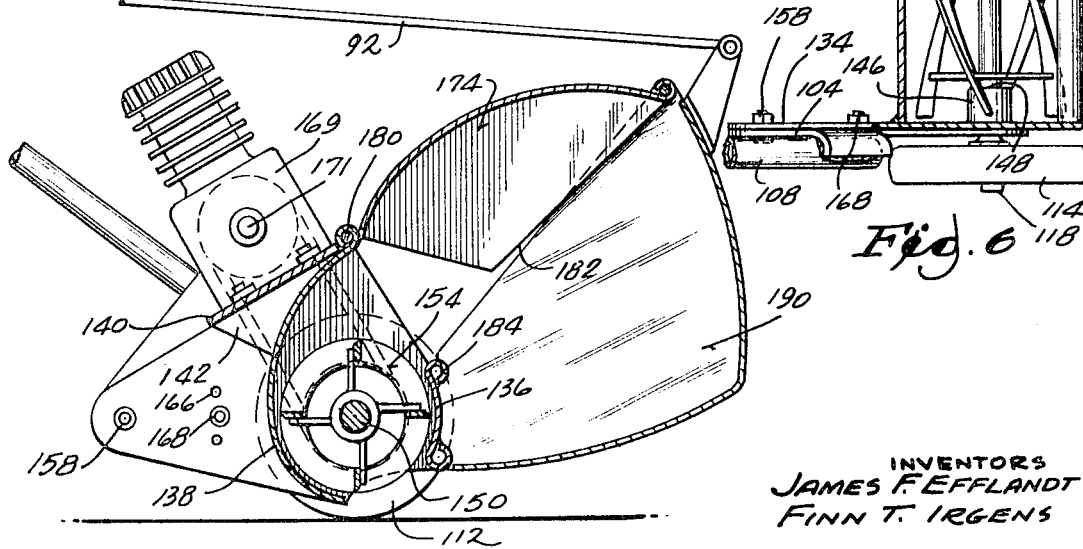

REEL LAWN MOWER WITH FORWARDLY LOCATED CLIPPING RECEPTACLE

BACKGROUND OF INVENTION

The invention relates to lawn mowers, and more particularly to lawn mowers utilizing high speed cutting reels which do not utilize a fixed bed knife, and in which the cutting reel cooperates with a reel housing to create an air flow for pneumatically conveying the clippings from the cutting zone and directionally discharging the clippings. The invention set forth herein is a further development of the subject matter set forth in U.S. Pat. application Ser. No. 770,765.

SUMMARY OF INVENTION

The invention provides a lawn mower which can be supported by two or four wheels, and which utilizes a high speed cutting reel which cuts the grass located within the cutting zone in and beneath a downwardly facing opening in a reel housing. The lawn mower discharges clippings and debris forwardly of the cutting reel and operator to minimize the hazard of missiles to the mower operator caused by impact of the cutting reel with stones or other objects. The invention also provides a rearwardly open grass clipping receptacle which is located forwardly of the cutting reel to receive the forward discharge of clippings.

More specifically, the lawn mower reel housing includes a reel housing portion which is forwardly concave and curves around the rear of the cutting reel. The clippings are directionally discharged by a downwardly concave deflector or discharge chute which is pivotally connected to the upper end of the forwardly concave reel housing wall portion and extends forwardly of the cutting reel. The deflector can be employed in a first position to cause discharge of the clippings toward the ground or in a second position to direct clippings into the grass clipping receptacle. When a grass clipping receptacle is used, the deflector is displaced angularly upwardly from the first position to the second position and connected to the upper edge of a grass clipping receptacle. The receptacle is rearwardly open to receive clippings directed forwardly by the deflector. Means are provided for pivotally displacing the receptacle about the pivotal connection with the deflector for dumping the receptacle or emptying the receptacle into a basket or onto the ground.

In a four wheel embodiment of the mower, the wheels for supporting the mower above the ground are rotatably supported in spaced mower side walls. In order to permit grass cutting close to walls and hedges, the cutting reel is rotatably supported in outwardly offset side wall portions located between the front and rear wheels. Thus, the cutting reel can have a length as great or greater than the distance between the two front wheels. Height adjustment of the four wheel mower is afforded by selectively locating the front wheel axles in any one of a series of vertically aligned, spaced axial apertures in the mower side walls.

In a two wheel embodiment of the invention, the depth of cut is adjusted by varying the height of the cutting reel. In this regard, the cutting reel is rotatably supported in the side walls of a casing which includes a reel housing and a motor mounting pad. The casing is located between spaced frame side plates of a frame assembly which rotatably carries the mower wheels and includes the mower handle. The casing side plates are pivotally connected to the frame side plates so that the casing, cutting reel and engine can swing in an arc between the wheels. The casing and cutting reel are located at the desired angular position with respect to the pivotal connection by a series of spaced apertures in the frame side plates located at a common radius with respect to the pivotal connection, and a bolt which is extended through the desired aperture and through an aperture in the casing side plates.

It is an object of the invention to provide a lawn mower which has a cutting reel housing which is upwardly and forwardly open and which has a hinged deflector which extends forwardly from the reel housing and which can be employed in a first position for discharging the clippings downwardly and forwardly of the mower onto the ground or in a second position displaced upwardly from the first position to deflect the clippings into a rearwardly open receptacle.

It is a further object of the invention to provide a lawn mower with a discharge chute for discharging the clippings forwardly of the mower into a grass clipping receptacle which is pivotally mounted for dumping the receptacle contents forwardly of the mower.

It is an additional object of the invention to provide a two wheel lawn mower in which a cutting reel, cutting reel casing and the engine are pivotally supported within the frame side portions of a frame, handle, and wheel assembly to afford height adjustment of the cutting reel to vary the depth of cut.

It is another object of the invention to provide a four wheel lawn mower in which the wheels are connected to mower side walls and the cutting reel is supported in outwardly offset side wall portions located between the front and rear wheels to permit grass cutting close to walls, etc.

Further objects and advantages of the invention will become apparent from the foregoing description and accompanying drawings.

THE DRAWINGS

FIG. 4 is a side view of the lawn mower shown in FIG. 1 and including a grass clipping receptacle.

FIG. 5 is a side elevational view of a further embodiment of the lawn mower of the invention.

FIG. 6 is a fragmentary bottom view of the lawn mower shown in FIG. 5.

FIG. 7 is a side view in fragmentary section of the lawn mower shown in FIG. 5 together with a grass clipping receptacle.

DETAILED DESCRIPTION

Figure 1:
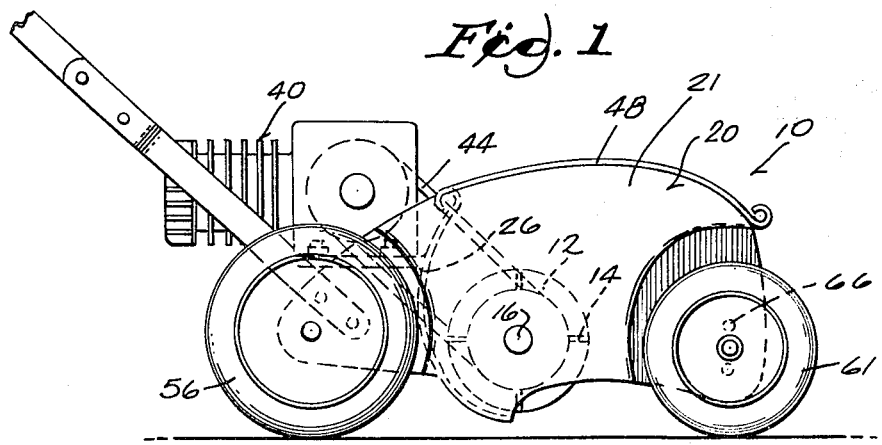
FIG. 1 is a side elevational view of the lawn mower in accordance with the invention.

In the drawings, FIG. 1 discloses a lawn mower which is generally designated 10, including a cutting reel 12 which comprises a plurality of helical cutting blades 14 arranged around a cutting reel shaft 16 and secured to the shaft 16 by a series of transversely extending spaced partitions 18.

Figure 2:
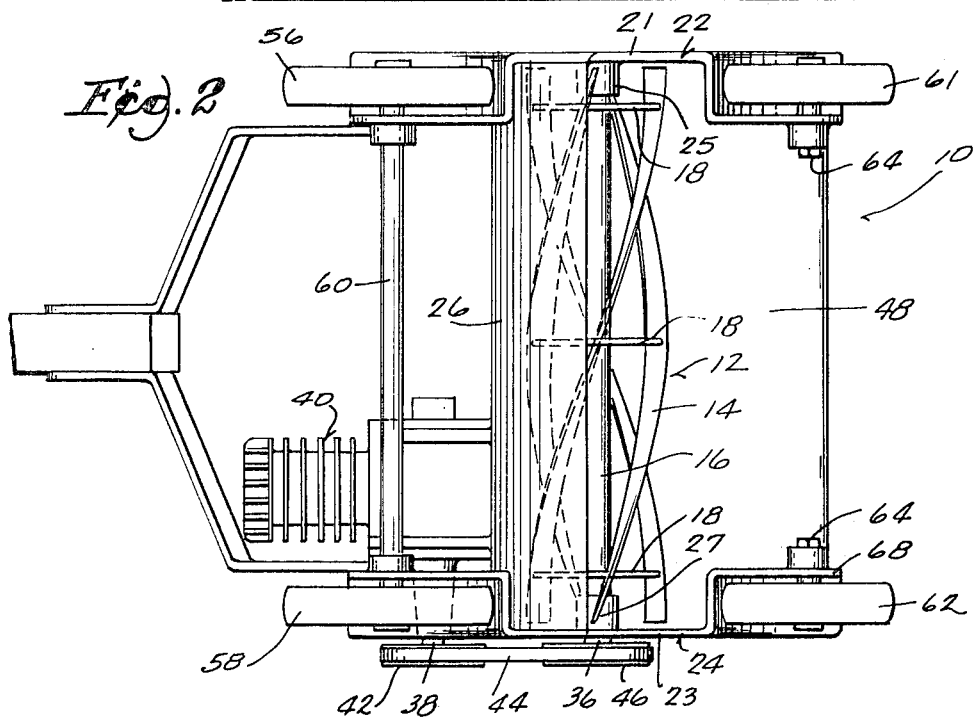
FIG. 2 is a bottom view of the lawn mower shown in FIG. 1.
Figure 3:
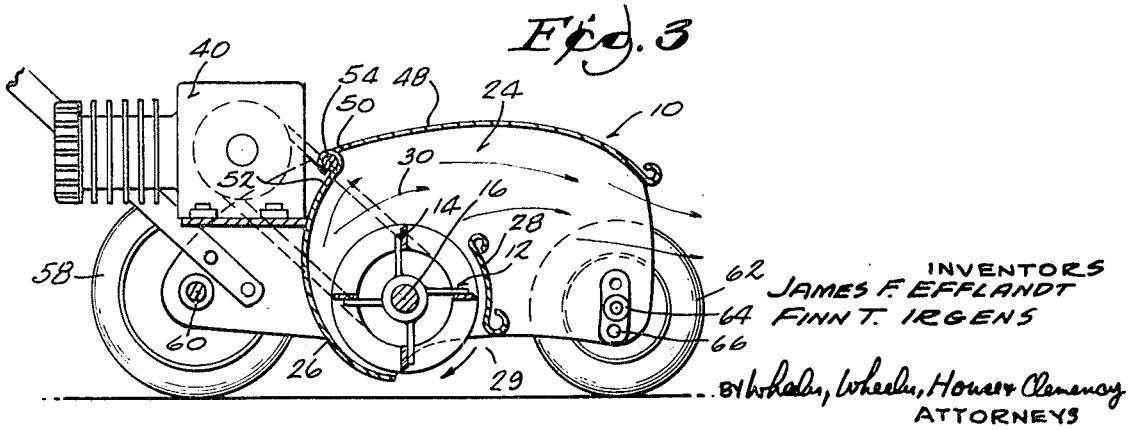
FIG. 3 is a side view in fragmentary section of the lawn mower shown in FIG. 1.

The lawn mower also includes a casing or reel housing generally designated 20 which includes a pair of spaced side walls 22 and 24. To permit trimming close to a wall or hedge, etc., the side walls can be provided with outwardly offset wall portions 21 and 23 (FIG. 2) which are provided with inwardly extending bosses 25 and 27 for rotatably supporting the cutting reel 12. Thus, the cutting reel spans the width of the mower. The casing also includes a curved or forwardly concave reel housing wall portion 26 located rearwardly in adjacent relation to the cutting reel 12 and extending between and connected to the side walls 22 and 24, and a forwardly located rearwardly concave reel housing wall portion 28 which, together with the reel housing wall portion 26, define a downwardly facing lower opening 29 (FIG. 3). The reel housing wall portions 26 and 28 cooperate with the rotating cutting reel 12 to cause an upwardly and forwardly moving air flow as shown by the arrows designated 30 in FIG. 3. The opening 29 exposes the cutting blades 14 to the grass.

The end 36 of shaft 16 extends through boss 27 to connect the cutting reel 12 to the output shaft 38 of an engine 40. The engine output shaft 38 is provided with a pulley 42 which is connected by a belt 44 to a pulley 46 on shaft 16. The side of the mower opposite the pulleys 42 and 46 is used for trimming close to a hedge or a wall.

To promote forward and downward discharge of grass clippings, the invention provides a downwardly concave deflector 48. The deflector 48 is pivotally connected at its rearward end 50 to the upper end 52 of reel housing portion 26 by a hinge 54. When a grass clipping receptacle is not utilized with the mower as hereinafter described, the deflector 48 is supported in a first position shown in FIGS. 1 and 3 by the upper edges of the side walls 22 and 24 for discharge of clippings forwardly and downwardly to the ground.

The lawn mower 10 is supported for travel in adjacent relation to the ground by rear wheels 56 and 58 which are connected to an axle 60 which is rotatably supported in the side walls 22 and 24. The front of the mower is rotatably supported by front wheels 61 and 62 which are rotatably connected to the side walls 22 and 24 by bolts 64 which can be selectively located in any of a series of apertures 66 in the side walls and mounting partitions 68 to afford selective height adjustment of the cutting reel 12 to vary the depth of cut.

The invention also provides a grass clipping and debris receptacle 70 (FIG. 4) which includes a front or forward wall 72, a bottom wall 74 and a pair of spaced side walls 76 which define a rearwardly located opening 78. Means are provided for pivotally connecting the receptacle to the forward end of the deflector 48. As disclosed, the means includes a hinge 80 with a hinge pin 82 which extends through loops 84 in the deflector and a loop 86 in a reinforced upper edge 88 of the receptacle 70. The receptacle is supported in the receiving position shown in FIG. 4 in solid lines by notches 89 in the side walls 76 of the receptacle and arcuate wall portions 91 and 93 of reel housing wall portion 28. The receptacle 70 is held in place against the reel housing wall portion 28 by gravity. Alternatively, a latch can be employed.

Means are also provided for angularly displacing the receptacle 70 about the hinge 80, as shown in broken lines in FIG. 4, for dumping the clippings from the opening 78 onto the ground or into a bucket (not shown) located forwardly of the mower. As disclosed, the means includes an upstanding bracket 90 secured to the front wall 72 of the receptacle and forwardly of the hinge. The bracket 90 can be connected to a cord or wire 92 extending rearwardly for connection to a mower handle 94 which is connected to the side walls 22 and 24 by bolts 95.

A further embodiment of the lawn mower of the invention is shown in FIGS. 5, 6 and 7. In this embodiment, the lawn mower includes a frame, handle and wheel assembly generally designated 100 which includes a pair of spaced frame side plates 102 and 104 (FIG. 6) which are connected to the legs 106 and 108 of a handle 110. The frame, handle and wheel assembly 100 include a pair of front wheels 112 and 114 which are rotatably carried by stub shafts 116 and 118, which are secured to frame side plates 102 and 104. The side plate 102 is provided with an offset plate portion 120 to provide a gap 121 for a reel driving pulley 124.

The embodiment of the invention shown in FIGS. 5, 6 and 7 also includes a casing 130 which comprises side walls 132 and 134, a forwardly concave reel housing wall portion 136 and a rearwardly concave wall portion 138. The wall portions 136 and 138 are welded or otherwise secured to the casing walls 132 and 134. The reel housing also includes a motor mounting plate or pad 140 which is mounted on the reel housing wall portion 138 by a bracket 142. The side walls 132 and 134 are provided with inwardly extending bosses 144 and 146, each of the bosses 144 and 146 having an axial aperture 148 for rotatably supporting a shaft 150 which carries the cutting reel 154.

In accordance with the invention, means are provided for pivotally supporting the casing within the frame assembly to vary the height of the cutting reel above the ground to thereby vary the depth of cut. As disclosed, the means includes bolts 156 and 158 which extend through apertures 159 in the frame side plates 102 and 104 and apertures 161 in casing side walls 132 and 134. The means also includes a series of spaced apertures 166 in either the frame side plates or casing side walls. The apertures 166 are arranged at a common radius with respect to the bolts 156 and 158. Bolts 168 can be selectively located in any of the apertures 166 to position the cutting reel at the desired height above the ground. Inasmuch as the engine 169 is secured to the motor mounting pad 140 which is secured to the reel housing wall portion 138 of the casing 130, the engine 169 moves with the cutting reel as the cutting reel is displaced about the pivotal connection between the casing 130 and the frame assembly 100, and thus the engine output shaft 171 remains at a constant distance from the pulley 124 on the cutting reel shaft 150.

In the embodiment of the invention shown in FIGS. 5, 6 and 7, the deflector 174 includes depending spaced side walls 176 secured to the side edges of deflector 174 to form a discharge chute 178. The discharge chute is pivotally connected by a hinge 180 to the upper edge of the reel housing wall portion 138.

When the lawn mower 100 shown in FIGS. 5, 6 and 7 is in use without a grass clipping receptacle, the lower edges 182 of the chute side walls 178 rest on the upper edge 184 of the reel housing wall portion 136. Thus, the chute outlet opening 186 discharges the clippings downwardly and forwardly of the cutting reel.

When the lawn mower 110 is utilized with a grass clipping receptacle 190, as shown in FIG. 7, the deflector 174 is displaced upwardly and forwardly about the hinge 180 and is connected at its upper edge to the receptacle 190. The receptacle 190 can also be provided with means for dumping the receptacle forwardly of the mower to discharge the contents, as hereinabove described for the mower 10.

Various of the features of the invention are set forth in the following claims.

What is claimed is:

1. A lawn mower having an intended direction of travel, said mower comprising a reel having cutting means, a casing rotatably supporting said cutting reel, said casing including a downwardly facing lower opening to expose said cutting reel to grass located in said opening, said casing also including a wall portion which is forwardly concave with respect to the intended direction of travel, wheel means for supporting said casing for travel along the ground, a downwardly open deflector extending forwardly of said wall portion, means for pivotally connecting said deflector to said casing, and means for supporting said deflector in a first position to deflect clippings and debris downwardly toward the ground and forwardly of said cutting reel.

2. A lawn mower in accordance with claim 1 wherein said deflector has depending side walls having lower edges, and said means for supporting said deflector in a first position to deflect clippings downwardly toward the ground and forwardly of said cutting reel comprises a rearwardly concave reel casing wall portion having an edge which engages the lower edges of said side walls on said deflector.

3. A lawn mower in accordance with claim 1 wherein said means for supporting said deflector in a first position to deflect clippings downwardly toward the ground and forwardly of said cutting reel comprises casing side plates, said side plates having edges which engage said deflector.

4. A lawn mower in accordance with claim 1 wherein said means for pivotally connecting said deflector to said casing comprises a hinge connecting said deflector to said casing.

5. A lawn mower in accordance with claim 1 including a frame and wheel assembly, said assembly including spaced side plates, a handle connected to said side plates, and means for pivotally connecting said side plates to said casing.

6. A lawn mower in accordance with claim 5 including means for selectively adjusting the angular position of said casing with respect to said side plates to vary the depth of cut.

7. A lawn mower comprising a reel having cutting means, a casing rotatably supporting said cutting reel, said casing including a downwardly facing lower opening to expose said cutting reel to grass located in said opening, said casing also including a forwardly concave wall portion, wheel means for supporting said casing for travel along the ground, a deflector extending forwardly of said wall portion, means for pivotally connecting said deflector to said casing, means for supporting said deflector in a first position to deflect clippings and debris downwardly toward the ground and forwardly of said cutting reel, a rearwardly open grass clipping receptacle, and means for pivotally connecting said receptacle to said deflector to support said deflector in a second position displaced upwardly from said first position to deflect grass clippings forwardly into said receptacle.

8. A lawn mower in accordance with claim 7 wherein said receptacle includes side walls with rear edges having notches, and wall portions on said casing which interfit with said notches in said rear edges to maintain said receptacle in a grass clipping receiving position.

9. A lawn mower in accordance with claim 7 including means connected to said receptacle and operable remotely by the mower operator for pivoting said receptacle about said pivotal connection with said deflector to discharge the contents of said receptacle downwardly and forwardly of said casing.

10. A lawn mower in accordance with claim 9 wherein said means connected to said receptacle for tilting said receptacle about said pivotal connection with said deflector comprises a bracket connected to said receptacle forwardly said pivotal connection and a cord connected to said bracket and extending rearwardly from said receptacle.

11. A lawn mower in accordance with claim 1 including a frame, a handle connected to said frame for guiding mower movement, means for pivotally connecting said frame to said casing, means for selectively varying the relation of said casing relative to said frame about the pivotal connection between said casing and said frame to vary the depth of cut, and wheels rotatably supported on said frame.

12. A lawn mower comprising a reel housing including forwardly and rearwardly located reel housing wall portions, side plates connected to said forwardly and rearwardly located reel housing wall portions, a cutting reel rotatably supported between said side plates and within said reel housing wall portions, a deflector pivotally connected to said rearwardly located housing wall portion, said deflector including a top wall and depending deflector side walls, the lower edges of said deflector side walls engaging the upper edge of said forwardly located reel housing wall portion to support said deflector in a first position for discharge of clippings downwardly and forwardly of the cutting reel, a frame assembly including a pair of spaced side plates located exteriorly of said reel housing side plates, wheels connected to said frame assembly side plates for supporting said frame assembly above the ground, means for pivotally connecting said frame assembly to said reel housing side plates, and means for selectively releasably fixing the angular position of said reel housing side plates relative to said frame assembly to vary the depth of cut.

13. A lawn mower in accordance with claim 12 including a grass clipping receptacle pivotally connected to said deflector, said deflector being connected to said receptacle to maintain said deflector in a second position displaced upwardly from said first position to discharge clippings into said receptacle, and means connected to said receptacle for pivoting said receptacle about said pivotal connection with said deflector to afford downward dumping of clippings forwardly of the mower cutting reel.

* * * * *